(12) United States Patent
Hershenzon

(10) Patent No.: US 7,563,038 B2
(45) Date of Patent: Jul. 21, 2009

(54) SUPPORT FOR A CAMCORDER

(75) Inventor: Gali Hershenzon, Tel Aviv (IL)

(73) Assignee: Lino Manfrotto + Co. S.p.A., Bassano del Grappo (IT)

( * ) Notice: Subject to any disclaimer, the term of this patent is extended or adjusted under 35 U.S.C. 154(b) by 516 days.

(21) Appl. No.: 11/455,799

(22) Filed: Jun. 19, 2006

(65) Prior Publication Data
US 2006/0285844 A1    Dec. 21, 2006

(30) Foreign Application Priority Data
Jun. 20, 2005   (IL) .................................... 169296

(51) Int. Cl.
*G03B 17/00* (2006.01)
(52) U.S. Cl. ............... 396/419; 396/420; 396/421; 396/425; 396/428
(58) Field of Classification Search ......... 396/419–421, 396/428, 425
See application file for complete search history.

(56) References Cited

U.S. PATENT DOCUMENTS

| | | | |
|---|---|---|---|
| 4,640,481 A * | 2/1987 | Kohno | 248/126 |
| 4,648,698 A * | 3/1987 | Iwasaki | 248/163.1 |
| 4,751,540 A * | 6/1988 | Jones | 396/419 |
| 4,989,466 A | 2/1991 | Goodman | |
| 5,043,750 A * | 8/1991 | Yamaguchi | 396/428 |
| 5,098,182 A * | 3/1992 | Brown | 352/243 |
| 5,243,370 A | 9/1993 | Slater | |
| 5,332,136 A | 7/1994 | Rudolph | |
| 5,390,885 A * | 2/1995 | Shen | 248/168 |
| 6,007,259 A * | 12/1999 | Mori et al. | 396/428 |
| 6,293,676 B1 | 9/2001 | Holway | |
| 6,773,110 B1 * | 8/2004 | Gale | 352/243 |
| 7,494,291 B2 * | 2/2009 | Saxton | 396/420 |

\* cited by examiner

*Primary Examiner*—Patrick J Assouad
*Assistant Examiner*—Michael A Strieb
(74) *Attorney, Agent, or Firm*—RatnerPrestia

(57) ABSTRACT

A support for a camcorder includes a platform connectable to a camcorder and a gripping handle attached via a multi-directional joint to the platform. The handle includes a head portion close to the multidirectional joint and is segmented along its major axis so as to define at least three pivotably connected leg portions, so as to enable the opening of the leg portions to form a mini-tripod for stationary support of the platform. The support further includes a stabilizer arm having a first end associated to the platform, an opposite second end to which a balancing, stabilizing weight is attached. The arm is provided with a joint enabling the pivoting of the second end of the arm between a first free-floating stabilizing position of the platform and a second position wherein the second end of the arm is suitable to rest on a shoulder-chest area of a camcorder operator.

23 Claims, 3 Drawing Sheets

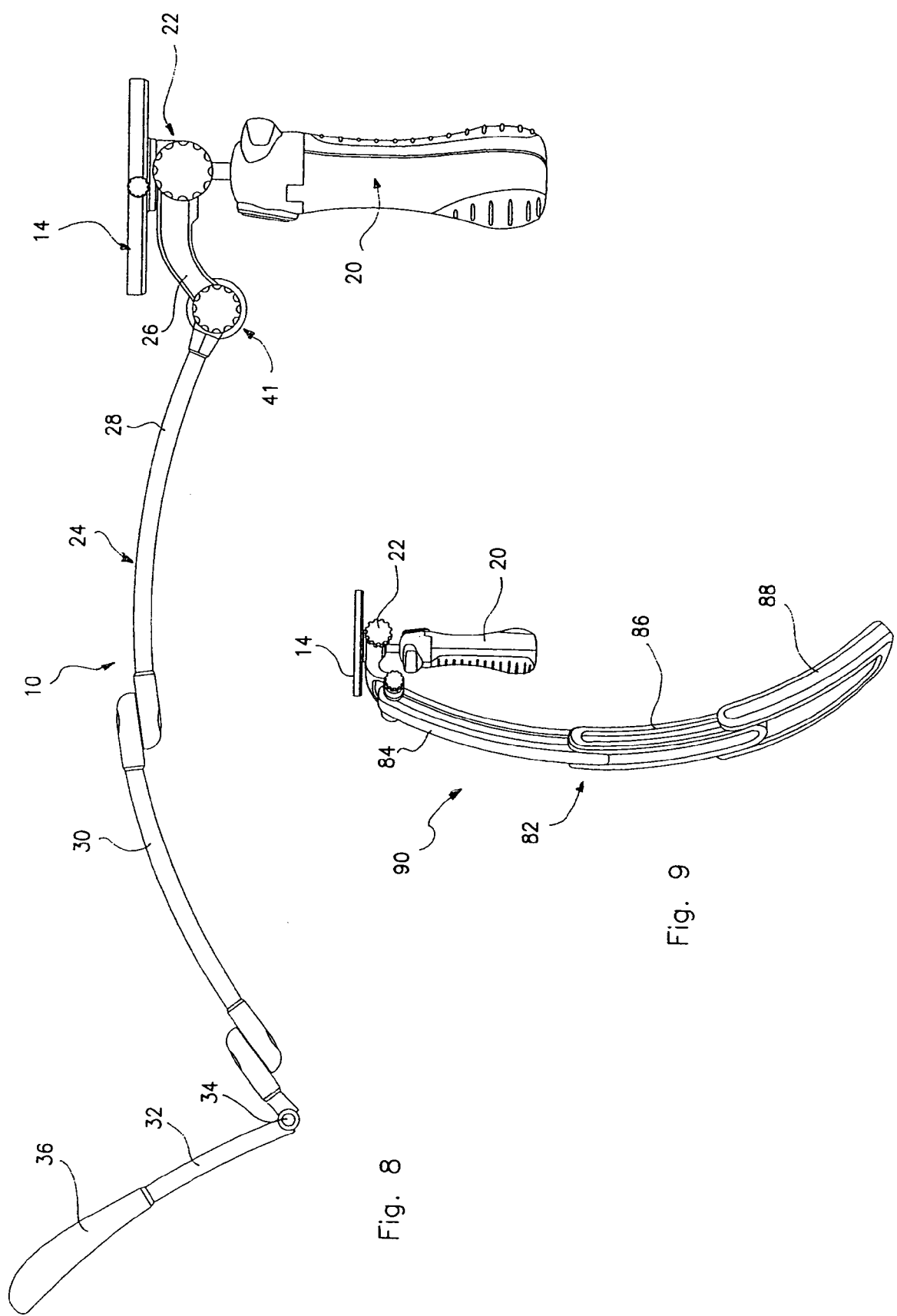

SUPPORT FOR A CAMCORDER

BACKGROUND OF THE INVENTION

The present invention relates to a support for a camcorder and, more particularly, the invention provides a lightweight and compact camera support designed to support a small hand-held camcorder in different operating modes.

As is well known, cameras of all types need to be supported steadily during filming, in order to produce a picture or film which is sharp and clear. It is a relatively simple matter to properly support a stationary camera, as all that is needed is a table, shelf or platform supported on a tripod. However, many cameras are held manually while the user is moving, either on foot or by vehicle. Also, a video camera is often used for scanning while being held either by hand or on a shoulder of the user. The problem is felt particularly by amateurs using today's palm-sized camcorders. Better results would certainly be achieved were it possible to hold the camera steadily while filming and moving.

Video camera supports presently available are large and heavy and are carried in a bag separate from the bag carrying the camera. The latter must be unscrewed after filming and reassembled at a new location. Furthermore, as in comparison with the modest price of a small camcorder, the price of supports currently marketed is high, resulting in many amateur photographers forgoing the use thereof.

Prior-art supports are typically fitted with a long handle (an example is seen in U.S. Pat. No. 6,773,110B1 to Gale) for controlling camera angles and further functions. The long handle is useful for steadying the camera and is part of a bulky and heavy device, as used by professional photographers.

The Gale patent provides a review of the state of the art and lists many previous patents on this subject.

Video camera supports can be stabilized to a limited degree by rigid struts extending between the body of the user and the camera platform, as seen for example in U.S. Pat. No. 5,332,136 to Rudolph.

Gyroscopes have been suggested by Goodman in U.S. Pat. No. 4,989,466. However at present a camera support so stabilized is suitable only for aerospace applications.

Stability can be improved using the inertia of a weight suspended at the extremity of a projecting arm. Examples of application of this method are seen in U.S. Pat. No. 5,243,370 to Slater and in U.S. Pat. No. 6,293,676B1 to Holway. However, the devices shown are large, heavy and of limited portability, they do not offer multiple means of use and are not arranged to be held in the hand of the user.

SUMMARY OF THE INVENTION

It is therefore one of the objects of the present invention to obviate the disadvantages of prior art camcorder supports and to provide a support which is light-weight and compact.

Another important object is to provide a camera support suitable for use in any desired mode, such as hand held, shoulder supported or resting on a flat stationary surface.

It is a further object of the present invention to provide a stabilized support suitable for a palm-sized camcorder.

Yet a further aim of the invention is to provide a support which is foldable and allows the camera to be carried in a standard video carrying bag while remaining attached to the support.

Yet another object of the invention is to provide a support suitable for mass production and which can be sold at an attractive price.

The present invention achieves the above objects by providing a support for a camcorder or a piece of photographic equipment, and has a platform, a gripping handle and a stabilizer arm. The platform is connectable to a camcorder or a piece of photographic equipment. The gripping handle is attached via a multi-directional joint to the platform, and the handle includes a head portion close to the multi-directional joint and the handle is segmented along its major axis so as to define at least three leg portions pivotably connected to the head portion, so as to enable the opening of the leg portions to form a mini-tripod for stationary support of the platform. The stabilizer arm has a first end associated to the platform, an opposite second end to which a balancing, stabilizing weight is attached, with the arm being provided with a joint enabling the pivoting of the second end of the arm between a first free-floating stabilizing position of the platform, and a second position wherein the second end of the arm is suitable to rest on a shoulder-chest area of an operator.

It will be realized that the support of the invention is advantageously multifunctional as well as small and lightweight, in particular it has a total weight of less than one kg., and a folded length of less than 25 cm, preferably a total weight of less than 500 grams and a folded length of less than 20 cm.

It will be noted that the small dimensions of the device are partly responsible for the low weight of the support, as well as the short distance between the platform and the multi-directional joint which affects the length of the weighted stabilizer arm.

It will thus be seen that the novel device of the present invention for the first time provides the amateur user of a palm-sized camcorder with an acceptable support assembly including a stabilizer arm. The stabilized support can be hand-held or shoulder mounted while the user is running, climbing stairs or being driven in a vehicle.

For shoulder mounting the geometry of the arm is arranged in a manner so that the eye of the user is distanced about 25 cm from the screen of the camera, as during tests this distance has been found to be optimum for several photographers.

For stationary use the lower gripping handle converts into a small tripod.

Quick deployment is facilitated by retaining the camcorder attached to the support during traveling and packing the equipment in a single carrying bag.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

FIG. 8 is an elevational view of the support of FIG. 1 deployed in an operative configuration for shoulder operation; and FIG. 9 is a perspective view of a further embodiment of the support of the invention.

DETAILED DESCRIPTION OF THE INVENTION

In the figures a support for a small camcorder 12, realized in accordance to the present invention is wholly indicated with 10.

Figures 1, 2, 3:
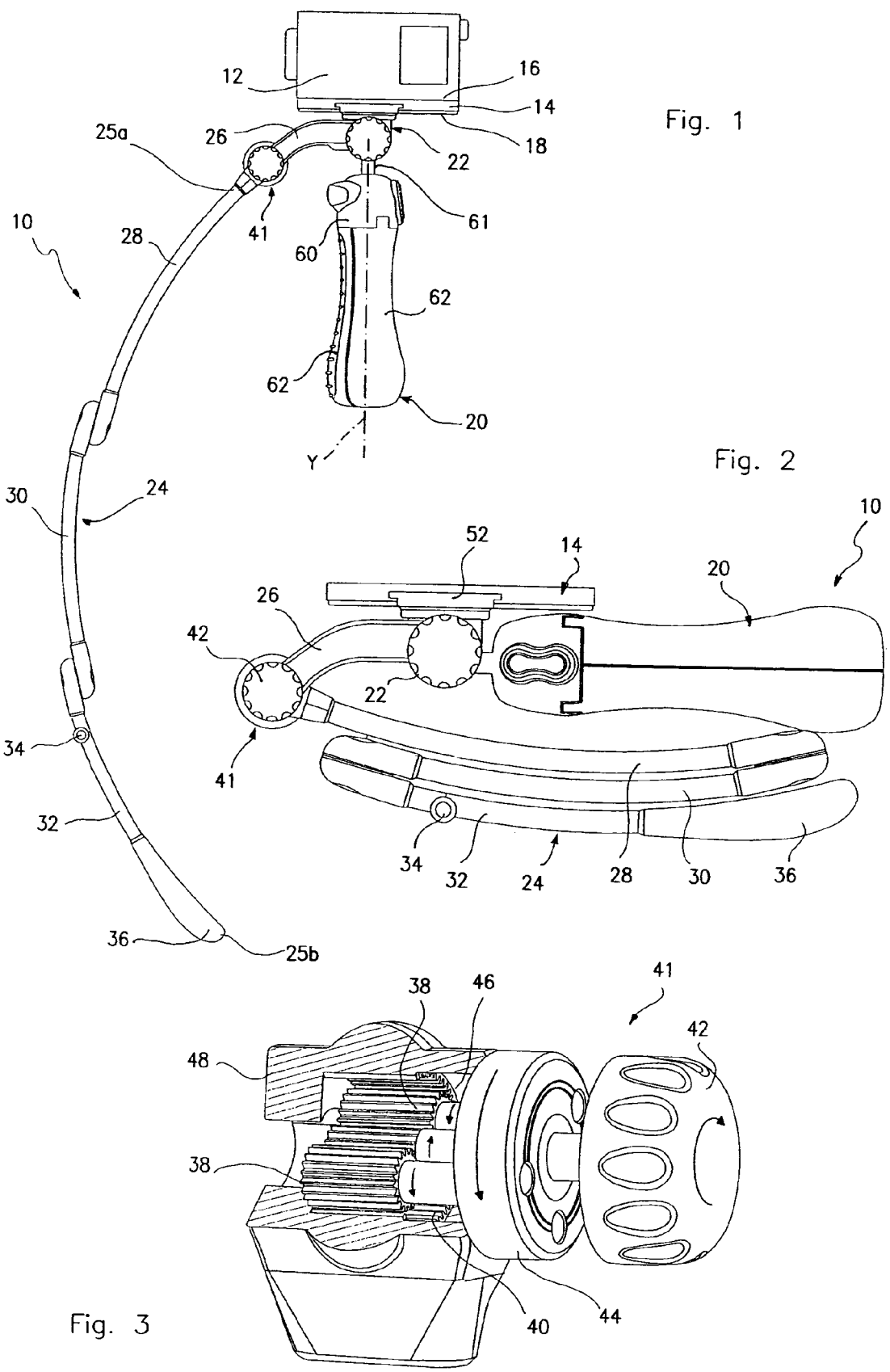
FIG. 1 is an elevational view of a preferred embodiment of the stabilized support deployed in an operative configuration for hand held operation according to the invention.
FIG. 2 is an elevational view of the support of FIG. 1, in a compact inoperative configuration.
FIG. 3 is a partially-sectioned perspective view of a detail of the support of FIG. 1.

In FIG. 1 the support 10 is deployed in an extended operative configuration.

The support 10 comprises a rigid platform 14 having an upper surface 16 and an underside 18, and being connected to the hand-held camcorder 12. A gripping handle 20, extended along a major longitudinal axis Y, is attached, via a multi-directional joint 22, to the underside 18 of the platform 14.

Figure 5:
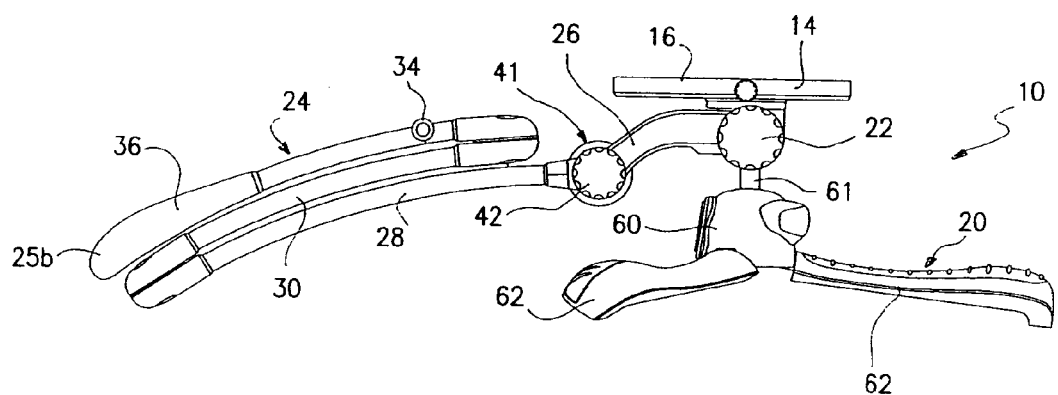
FIG. 5 is an elevational view of the support of FIG. 1 deployed in an operative configuration for stationary operation.

The gripping handle 20 comprises a rod 61, attached to the multidirectional joint 22, and a head portion 60, attached to the rod 61, opposite to the multidirectional joint 22. The handle 60 is segmented along its major axis Y so as to define three leg portions 62 pivotably linked to the head portion 60. In this way, the leg portions 62 may be opened to form a mini-tripod for stationary support for the platform 14 and for the camcorder 12, as shown in FIG. 5.

The support 10 also comprises a multi-directional, multi-functional stabilizer arm 24, having a first end 25a attached to the platform 14 via the multi-directional joint 22. The arm 24 comprises three curved series-jointed segments 28, 30 and 32. A balancing, stabilizing weight 36 of about 200-250 grams is attached to the second end 25b of the arm 24, and is held in a appropriate seat provided in the end segment 32. Preferably the weight 36 is made in lead or another material of similar specific gravity, so as to have reduced dimensions.

A joint 34 is provided in the end segment 32 of the stabilizer arm 24 in order to enable the pivoting of the second end 25b between a first free-floating stabilizing position of the platform 14 and a second position wherein the second end 25b of the arm 24 is suitable to rest on a shoulder-chest area of a camcorder operator.

In both positions the arm 24 is fully extended in operative configuration, the free-floating stabilizing position, suitable to be hand-held, is shown in FIG. 1, whereas the second position, suitable for resting on a shoulder-chest area of an operator, may be seen in FIG. 8.

As shown in FIG. 1, the stabilizer arm 24, in the free-floating stabilizing position, is regularly curved, with its concavity facing the gripping handle 20, whereas in the second position, the arm shows a curvature discontinuity in correspondence of the joint 34, to allow the end segment 32 to fit comfortably to the shoulder-chest area of the camcorder operator.

Advantageously, the three curved jointed segments 28, 30, 32, are movable one to the others, so as to move the stabilizer arm 24 from an extended operative configuration, shown in FIG. 1 and FIG. 8, to a compact inoperative configuration as shown in FIG. 2.

It will also be noted that the gripping handle 20 may be pivoted around the multidirectional joint 22 of about 90° from its operative position, thanks to an appropriate slot 21 provided in a component of the multidirectional joint 22.

The three segments 28, 30, 32 may be consecutively jointed by means of respective hinges provided at the ends of the segments, as shown in FIGS. 1, 2, 5 and 8, or as an alternative, they may be telescopically interconnected, as depicted in the embodiment shown in FIG. 9, wherein the support is wholly indicated with 90, the stabilizer arm with 82 and the three jointed segments with 84, 86, and 88.

The support has a total weight of less than 1 kg, and a total length, when moved in the compact inoperative configuration of FIG. 2, of less than 25 cm.

Preferably, the total weight of the support 10 is less than 500 grams, which is realized by the increased use of plastics, including fiber reinforced plastics, and the use of magnesium, aluminum and titanium alloys for appropriate parts requiring more hardness or rigidity, as well as a result of the relatively short distance between the upper surface 16 of platform 14, and the rotation center of the multi-directional joint 22.

Most preferably the support 10 is configured to have a total length, when moved in the compact inoperative configuration, of less than 20 cm. FIG. 2 makes clear that this is achieved by compact folding of the stabilizer arm 24, which is made possible by the three segments 28, 30 and 32 being hingedly interconnected in series.

The multidirectional joint 22 is of the ball and socket type, and comprises a ball 57 fixed to the rod 61 of the gripping handle 20, a trunnion fork 26, at a first end thereof being provided a seat 27 for housing the ball 57, and a vertical-axis pivot 54, partially housed in the seat 27 of the trunnion fork 26, at the opposite side of the ball 57. The distance between the surface 16 and center of the ball 57 is preferably less than 45 mm and most preferably less than 30 mm.

A sliding plate 52 is fixed at the end of the pivot 54 opposite to the trunnion fork 26, the sliding plate 52 being removably engaged in a T-shaped slot 50 provided in the underside 18 of the platform 14.

The provision of the pivot 54 allows the pivoting of the platform 14 (and of the camera 12 attached thereto) about its longitudinal axis (substantially vertical in the operative configuration), in order to allow panoramic shots of the camera 12. This is also particularly useful for enabling the 180° rotation of the camera 12 between the free floating position of FIG. 1 and the shoulder supported position of FIG. 8.

The end of the pivot 54 opposite to the platform 14 is housed in the seat 27, so that any movement of the pivot 54, different from the rotation about the longitudinal axis thereof, is transmitted to the trunnion fork 26.

The multidirectional joint 22 further includes a lock-screw 56 the stem thereof is designed to engage a circumferential groove 55 provided on the pivot 54, in order to prevent the exit of the pivot 54 from the seat 27. Furthermore, the stem of the lock-screw 56 has a tapered end (not shown), so that, with a deeper engagement of the stem of the screw 56 in the groove 55, the pivot 54 may be urged against the ball 57, thus locking the pivot 54 to the gripping handle 20. This is particularly useful when the gripping handle 20 is converted into a mini tripod as described above.

Preferably, the position of the sliding plate 52 in the T-slot 50 may be adjusted acting on a screw 53. Similarly, a second screw may be provided in order to adjust the sliding plate along a second direction perpendicular to the one defined by the screw 53.

This provision is useful for assuring that the camera 12 is horizontally aligned so as to center the weight thereof on the vertical axis passing through the multidirectional joint 22.

This adjustment may be needed whenever the camera weight becomes off-center because of a change of battery, microphone or even the camera itself.

The camcorder 12 is retained on the platform 14 by means of a further screw 59, or, as an alternative, by means of a quick lock fitting. The use of the screw, however, allows to keep reduced weight and more compact vertical dimension.

The trunnion fork 26, opposite to the seat 27, comprises a forked second end on which the first end 25a of the arm 24 is supported with an articulated joint 41.

The support 10 further comprises means for controlling and locking the articulated joint 41 so as to adjust the angular position between the arm 24 and the trunnion fork 26.

The angular positioning of the arm 24 with respect to the trunnion fork 26 is needed when the support 10 is in the free-floating position (FIG. 1), for providing an up and down tilt movement of the camera 12, which might be used, for example, in filming a tall building.

In a first embodiment shown in FIG. 3 the means for controlling and locking the articulated joint 41 comprises a planetary gears mechanism, which smoothly changes the angular relationship between the arm 24 and the platform 14.

This mechanism comprises a pair of planetary gears 38 integral with a component 44 of the articulated joint 41, an outer gear 46 attached to an housing 48 of the articulated joint 41, the housing 48 being attached to the first end 25a of the arm 24, and a control handle 42 driving a sun gear 40.

The planetary gear mechanism provides damped, controlled, forward and backward tilting, and also improves the fine control thereof because a full revolution of the control handle 42 causes less than 25% of a turn of the platform 14.

Figure 4:
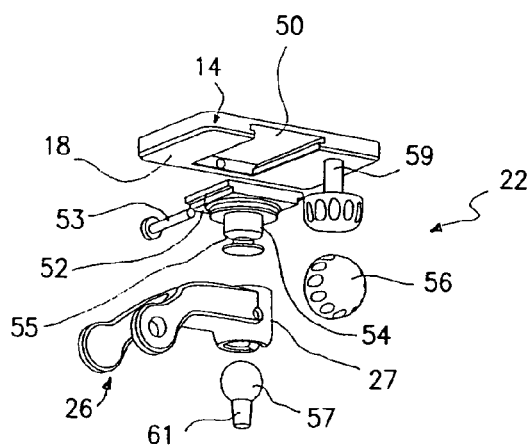
FIG. 4 is an exploded view of components of the multi-directional joint of the support of FIG. 1.
Figure 6:
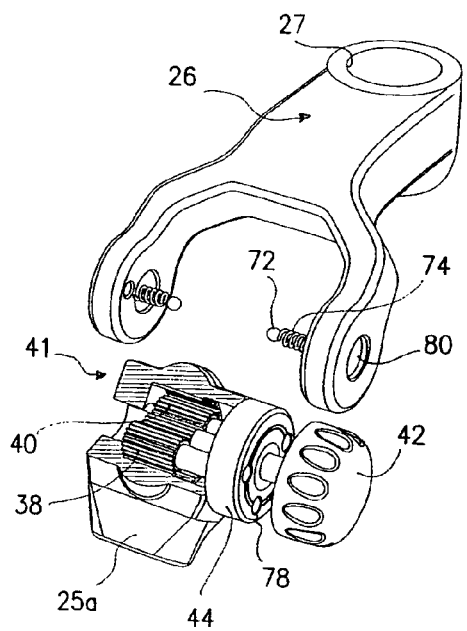
FIG. 6 is a partially sectioned and partially exploded perspective view of a particular of the support of FIG. 1.
Figure 7:
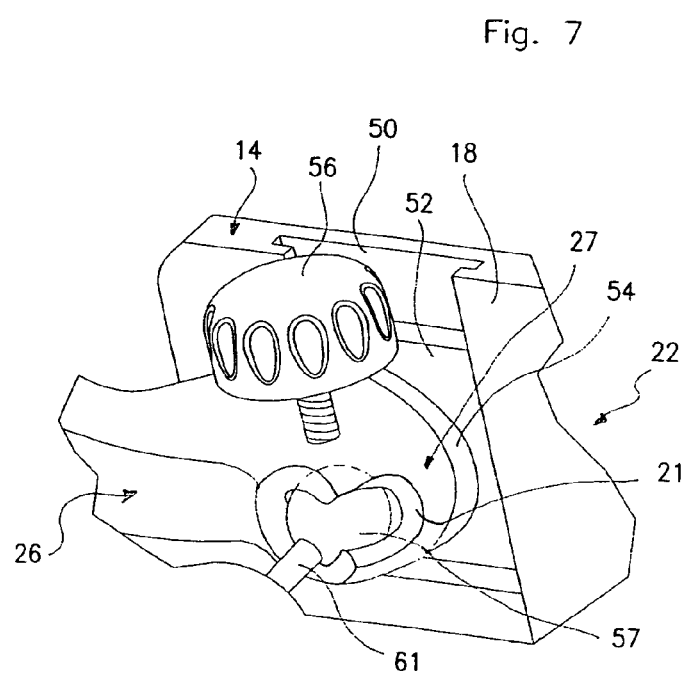
FIG. 7 is a perspective view from the bottom of the components of FIG. 4 in assembled configuration.

As will be noted now, with reference to FIGS. 3 and 6, when one rotates sun gear 40 by turning the handle 42, a relative movement between the arm 24 (not shown), which is attached to housing 48, and the fork unit 26 is obtained, thereby allowing the tilting of platform 14 as shown in FIGS. 1 and 4, and the camera 12 attached thereto.

According to another embodiment of the invention, not shown in the attached drawings, the means for controlling and locking the articulated joint 41 comprises friction means driven by the control handle 42.

FIG. 6 shows the articulated joint of another embodiment of the support of the invention wherein the articulated joint 41 is provided with detents 78 to enable the arm 24 to maintain any of several predetermined positions.

The trunnion fork 26 carries two inwardly facing balls 72 and compression springs 74. The component 44 of the articulated joint 41 has several outward-facing detent recesses 78 at a radius from the sun gear 40 center which corresponds to the distance between the balls center and the articulation axis, also corresponding to the center of a bore 80 provided at the forked end of the trunnion 26 for supporting the articulation joint 41. Balls 72 enter recesses 78 to fix the position of the arm 24 for free floating use (FIG. 1) or shoulder use (FIG. 8).

Similar detents may be provided in the joint 34, for defining the first and the second position of the weighted end 25b of the arm 24, as well as in the joints between the segments 28, 30 and 32 of the arm 24, for fixing the arm 24 in the extended operative configuration or in the compact inoperative configuration.

Preferably, the support of the present invention further comprises control means of the camcorder 12, integrated in the gripping handle 20, in order to control some of the most frequently controls used by the camera operator. As shown in FIGS. 1, 5 and 8, the above mentioned control means may comprise a first button 64 and a second button 65 arranged to control, for instance, the start/stop of the camera recording and the camera zoom respectively.

Preferably, buttons 64 and 65 are provided in the head portion 60 of the gripping handle 20, so as to be easily pressed by the operator by means of a simple movement of the thumb and the forefinger.

As an alternative, the control means of the camcorder 12 may provide both controls driven by a single button, instead of two separate buttons 64, 65.

The control means also comprise means for transmitting a control signal to the camera 12. In a first preferred embodiment, the means for transmitting the control signal comprises a socket, not shown in the drawings, for a flexible cable suitable to connect the camcorder to the support 10. In a second preferred embodiment, the means for transmitting the control signal to the camera are of the infrared (IR) type.

The support of the invention achieves therefore the intended objects, being light-weight and compact, and allowing multiple operating modes for using the hand-held camcorder: free floating use, shoulder resting use and stationary use as a mini-tripod.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A support for a camcorder comprising: a) a platform connectable to a camcorder; b) a gripping handle attached via a multi-directional joint to said platform, said handle comprising a head portion close to the multidirectional joint and said handle being segmented along its major axis so as to define at least three leg portions pivotably connected to the head portion, so as to enable the opening of the leg portions to form a mini-tripod for stationary support of said platform; c) a stabilizer arm having a first end associated to said platform, an opposite second end to which a balancing, stabilizing weight is attached, said arm being provided with a joint enabling the pivoting of the second end of the arm between a first free-floating stabilizing position of the platform and a second position wherein the second end of the arm is suitable to rest on a shoulder-chest area of a camcorder operator, and wherein said stabilizer arm comprises at least three jointed segments, movable one to the others so as to move the stabilizer arm from an extended operative configuration to a compact inoperative configuration and vice versa.

2. The support according to claim 1, wherein said at least three jointed segments are hingedly interconnected in series, for folding said arm stabilizer when moved to the compact inoperative configuration.

3. The support according to claim 1, wherein said at least three jointed segments are telescopically interconnected.

4. The support according to claim 1, wherein at least one of said joints is provided with detents to define a preferred position between the jointed elements.

5. The support according to claim 1, wherein said support has a total weight of less than 1 kilogram and a total length in the compact inoperative configuration of less than 25 cm.

6. The support according to claim 5, wherein said support has a total weight of less than 500 grams and a total length in the compact inoperative configuration of less than 20 cm.

7. The support according to claim 1, wherein the distance between an upper surface of said platform and said multi-directional joint is less than 45 mm.

8. The support according to claim 1, wherein the distance between an upper surface of said platform and said multi-directional joint is less than 30 mm.

9. The support according to claim 1, wherein control means of the camcorder are provided, in order to control at least one operating function of the camcorder.

10. The support according to claim 9, wherein said control means are integrated in the gripping handle.

11. The support according to claim 9, wherein said control means are arranged to control the start/stop of the camcorder recording and the zoom of the camcorder.

12. The support according to claim 9, wherein said control means comprises means for transmitting a control signal to the camcorder.

13. The support according to claim 12, wherein said means for transmitting the control signal to the camcorder comprises a socket for a flexible cable connecting the camcorder to the support.

14. The support according to claim 12, wherein said means for transmitting the control signal to the camcorder are of the infrared type.

15. A support for a camcorder comprising: a) a platform connectable to a camcorder; b) a gripping handle attached via a multi-directional joint to said platform, said handle comprising a head portion close to the multidirectional joint and said handle being segmented alone its major axis so as to define at least three leg portions pivotably connected to the head portion, so as to enable the opening of the leg portions to form a mini-tripod for stationary support of said platform; c) stabilizer arm having a first end associated to said platform, an opposite second end to which a balancing, stabilizing weight is attached, said arm being provided with a joint enabling the pivoting of the second end of the arm between a first free-floating stabilizing position of the platform and a second position wherein the second end of the arm is suitable to rest on a shoulder-chest area of a camcorder operator, and wherein an articulated joint is provided between the stabilizer arm and a component of the multidirectional joint connected to the platform, and wherein means for controlling and locking said articulated joint are provided in order to adjust the angular position between the stabilizer arm and the multidirectional joint.

16. The support according to claim 15, wherein said means for controlling and locking the articulated joint comprise a planetary gears mechanism.

17. The support according to claim 15, wherein said means for controlling and locking the articulated joint comprise friction means.

18. A support for a camcorder comprising: a) a platform connectable to a camcorder; b) a gripping handle attached via a multi-directional joint to said platform, said handle comprising a head portion close to the multidirectioflal joint and said handle being segmented alone its major axis so as to define at least three leg portions pivotably connected to the head portion, so as to enable the opening of the leg portions to form a mini-tripod for stationary support of said platform; c) a stabilizer arm having a first end associated to said platform, an opposite second end to which a balancing, stabilizing weight is attached, said arm being provided with a joint enabling the pivoting of the second end of the arm between a first free-floating stabilizing position of the platform and a second position wherein the second end of the arm is suitable to rest on a shoulder-chest area of a camcorder operator, and wherein said multidirectional joint is of the ball and socket type and comprises a ball fixed to the gripping handle, a trunnion fork in which is provided a seat for housing said ball and connected to the stabilizer arm, and a pivot partially housed in said seat, opposite to the ball, and fixed to said platform.

19. The support according to the claim 18, wherein said pivot is freely pivotable about its longitudinal axis with respect to said trunnion fork and said ball.

20. The support according to the claim 19, wherein the pivot is restrained in the seat by means of a lock-screw engaged in the trunnion fork and in a circumferential groove provided in the pivot.

21. The support according to the claim 20, wherein said lock screw has a tapered end so as to urge the pivot against the ball.

22. The support according to the claim 18, wherein said pivot comprises a sliding plate, opposite to said ball, adjustably engaged in a slot provided in said platform.

23. A support for a photographic equipment comprising: a) a platform connectable to a photographic equipment; b) a gripping handle attached via a multi-directional joint to said platform, said handle comprising a head portion close to the multidirectional joint and said handle being segmented along its major axis so as to define at least three leg portions pivotably connected to the head portion, so as to enable the opening of the leg portions to form a mini-tripod for stationary support of said platform; c) a stabilizer arm having a first end associated to said platform, an opposite second end to which a balancing, stabilizing weight is attached, said arm being provided with a joint enabling the pivoting of the second end of the arm between a first free-floating stabilizing position of the platform, and a second position wherein the second end of the arm is suitable to rest on a shoulder-chest area of a photographic equipment operator, and wherein said stabilizer arm comprises at least three jointed segments, movable one to the others so as to move the stabilizer arm from an extended operative configuration to a compact inoperative configuration and vice versa.

* * * * *